United States Patent
Ballard et al.

(10) Patent No.: US 8,125,346 B2
(45) Date of Patent: Feb. 28, 2012

(54) ANALOG-STYLE INSTRUMENTATION DISPLAY WITH COLOR-CHANGING POINTER

(75) Inventors: Claudio R. Ballard, Fort Lauderdale, FL (US); Jeff Seward, Fairfax, VT (US)

(73) Assignee: Veedims, LLC, Fort Lauderdale, FL (US)

( * ) Notice: Subject to any disclaimer, the term of this patent is extended or adjusted under 35 U.S.C. 154(b) by 215 days.

(21) Appl. No.: 12/395,647

(22) Filed: Feb. 28, 2009

(65) Prior Publication Data
US 2009/0272313 A1    Nov. 5, 2009

Related U.S. Application Data

(60) Provisional application No. 61/034,717, filed on Mar. 7, 2008.

(51) Int. Cl.
*G08B 21/00* (2006.01)
(52) U.S. Cl. ........ 340/688; 340/441; 340/438; 340/439; 340/449; 340/815.78; 340/815.86; 701/35; 701/36; 701/103
(58) Field of Classification Search .............. 340/688, 340/461, 441, 438, 439, 449, 815.78, 815.86; 701/35, 36, 103
See application file for complete search history.

(56) References Cited

U.S. PATENT DOCUMENTS

| 6,693,523 | B1 | 2/2004 | Abel et al. | |
| 7,786,851 | B2 * | 8/2010 | Drew et al. | 340/438 |
| 7,866,859 | B2 * | 1/2011 | Suzuki et al. | 362/489 |
| 2004/0155789 | A1 | 8/2004 | Crews | |
| 2005/0012607 | A1 * | 1/2005 | Sumiya et al. | 340/461 |
| 2007/0001830 | A1 | 1/2007 | Dagci et al. | |
| 2007/0030137 | A1 | 2/2007 | Masters et al. | |
| 2007/0247291 | A1 * | 10/2007 | Masuda et al. | 340/439 |

OTHER PUBLICATIONS

PCT: International Search Report of PCT/US09/35715 (related application); Apr. 29, 2009; 3 pgs.
PCT: Written Opinion of the International Searching Authority of PCT/US09/35715 (related application); Apr. 29, 2009; 4 pgs.

* cited by examiner

*Primary Examiner* — Tai T Nguyen
(74) *Attorney, Agent, or Firm* — Howison & Arnott, L.L.P.

(57) ABSTRACT

An analog-style gauge for displaying the value of a parameter measured or sensed by a remote sensor. The gauge comprises an actuator having a selectively rotatable shaft and a pointer fixedly attached to the actuator shaft and capable of being internally illuminated by light directed into the pointer. A light source is disposed to direct light of at least two colors into the pointer. Control circuitry is operably connected to the actuator, the light source and a remote sensor. The control circuitry rotates the actuator shaft within a range of motion in response to signals received from the remote sensor indicative of changes in the value of the sensed parameter. The control circuitry changes the color of light directed into the pointer when the pointer reaches a pre-determined point within the range of motion, whereby the internal illumination of the pointer will change color when the pointer reaches a predetermined point within the range of motion.

20 Claims, 7 Drawing Sheets

ANALOG-STYLE INSTRUMENTATION DISPLAY WITH COLOR-CHANGING POINTER

CROSS-REFERENCE TO RELATED APPLICATIONS

This application claims the benefit of U.S. Provisional Application for Patent Ser. No. 61/034,717, filed Mar. 7, 2008, and entitled ANALOG-STYLE INSTRUMENTATION DISPLAY WITH COLOR-CHANGING POINTER, the specification of which is incorporated herein in its entirety by reference.

TECHNICAL FIELD

The following disclosure relates to instrumentation display devices, and more particularly, to analog-style instrumentation display devices with color-changing pointers for use on gauges, gauge dials and other indicators.

BACKGROUND

It is known to use both analog-style and digital-style instrumentation display devices to show the value of a sensed or measured parameter, e.g., time, speed, RPMs, temperature, pressure, fuel level, altitude, etc. Digital-style instrumentation display devices show the value of the sensed/measured parameter directly, i.e., by displaying a single discrete number that corresponds to the current value of the parameter. In contrast, analog-style instrumentation display devices show the value of the sensed/measured parameter indirectly, i.e., by moving a pointer, needle or other indicator (collectively "pointer") within a predetermined range of motion (also known as a scale) that corresponds to the upper and lower measurement limits. The position of the pointer within the scale indicates the relative value of the sensed parameter (i.e., relative to the full scale). In some cases, indicia are provided to indicate numerical values for different positions on the scale, while in other cases only relative information such as "HOT" and "COLD" are provided.

It will be appreciated that the style (i.e., either analog or digital) of the display device is independent of the technology used for sensing/measuring the parameter and the technology used to operate the display. For example, a temperature gauge having a display dial with a moving pointer is considered to have an analog-style display, even if a digital sensing device is used to sense the temperature and a microprocessor-driven digital stepper motor is used to move the pointer. Further, even if the display device itself is fully digital, e.g., a computer-driven flat-panel display, it may still constitute an analog-style display device if it uses the image of a moving pointer traveling within a scale to convey sensed/measured parameter information to the viewer.

For reasons not fully understood, is believed that users can more quickly obtain useful information from analog-style instrumentation displays than from digital-style information displays. This appears especially true concentration-intensive activities such as driving or piloting a vehicle. In addition, many users simply prefer analog-style instrumentation displays for aesthetic reasons. Thus, analog-style instrumentation displays may be used in vehicles that extensively used digital technology for parameter sensing/measurement and communication.

It is known to provide a "redline" or similar color-coded indicia on the scale of an analog-style instrumentation display to denote the portion of the scale having values that are outside normal operating values. When the pointer of a display moves beyond the redline, it is important for the operator (e.g., of a vehicle) to take notice as soon as possible so as to assess whether corrective action is required. However, when numerous analog-style instrumentation displays are used together, it may become difficult to rapidly assess if any parameter is outside of its nominal operating range, even with the use of redlines or color-coded scales. A need therefore exists, for analog-style instrumentation displays that convey additional information to the user regarding the sensed parameter.

SUMMARY

In one embodiment, the present disclosure provides an analog-style gauge for displaying the value of a parameter measured or sensed by a remote sensor. The gauge comprises an actuator having a selectively rotatable shaft and a pointer fixedly attached to the actuator shaft and capable of being internally illuminated by light directed into the pointer. A light source is disposed to direct light of at least two colors into the pointer. Control circuitry is operably connected to the actuator, the light source and a remote sensor. The control circuitry rotates the actuator shaft within a range of motion in response to signals received from the remote sensor indicative of changes in the value of the sensed parameter. The control circuitry changes the color of light directed into the pointer when the pointer reaches a pre-determined point within the range of motion, whereby the internal illumination of the pointer will change color when the pointer reaches a predetermined point within the range of motion.

In another embodiment, the present disclosure provides an analog-style gauge for receiving signals from a remote sensor and displaying the value of a parameter sensed by the remote sensor. The gauge comprises an actuator having a shaft that is selectively rotatable through a range of motion having a plurality of sub-ranges. A pointer is fixedly attached to the actuator shaft and adapted to be internally illuminated. A light source selectively produces a plurality of illumination colors and is disposed so as to internally illuminate the pointer in the selected illumination color. Control circuitry is operatively connected to the actuator and the light source. The control circuitry rotates the actuator shaft within the range of motion in response to the signals received from the remote sensor until the pointer is in a position indicative of the value of the sensed parameter. The control circuitry controls the selected illumination color of the light source to be indicative of the sub-range of motion within which the actuator shaft is positioned. Thus, the illumination color of the pointer will change color when the pointer reaches a predetermined point within the range of motion.

In yet another embodiment, the present disclosure provides a vehicle instrumentation system for displaying, by means of the position of a pointer within a range of motion having a plurality of sub-ranges, a current value of a parameter sensed by a remote sensor and simultaneously indicating, by means of the illumination color of the pointer, the sub-range within which the value of the parameter currently lies. The system comprises an onboard computer mounted in the vehicle and operatively connected to the remote sensor to receive signals therefrom indicative of the current parameter value at the remote sensor. The computer includes a memory and a processor. The memory stores data regarding a plurality of sub-ranges, the information for each sub-range including the parameter values included within the sub-range. The processor receives the current parameter value, accesses the data in the memory to identify the sub-range within which the current parameter value lies and the illumination color assigned to the identified sub-range, and produces pointer control signals based on the current parameter value and illumination color control signals based on the illumination color assigned to the identified sub-range. A gauge is also provided having a movable pointer that can be selectively positioned and selectively illuminated with a plurality of illumination colors. The pointer is positioned based on the pointer control signals received from the onboard computer and is illuminated based on the illumination color control signals received from the onboard computer.

In yet another embodiment, the present disclosure provides a method of operating a gauge for displaying a current value of a parameter sensed by a remote sensor and simultaneously indicating a sub-range within a plurality of sub-ranges within which the current value of the parameter lies. The method comprises the following steps: Moving a pointer within a range of motion to a position indicative of the current value of the sensed parameter; determining which sub-range of a plurality of sub-ranges the current value of the sensed parameter lies within; determining which illumination color of a plurality of illumination colors is associated with the determined sub-range; and illuminating the pointer with the illumination color associated with the determined sub-range.

BRIEF DESCRIPTION OF THE DRAWINGS

For a more complete understanding, reference is now made to the following description taken in conjunction with the accompanying Drawings in which.

DETAILED DESCRIPTION

Referring now to the drawings, wherein like reference numbers are used herein to designate like elements throughout, the various views and embodiments of an analog-style instrumentation display with color-changing pointer are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Figure 1:
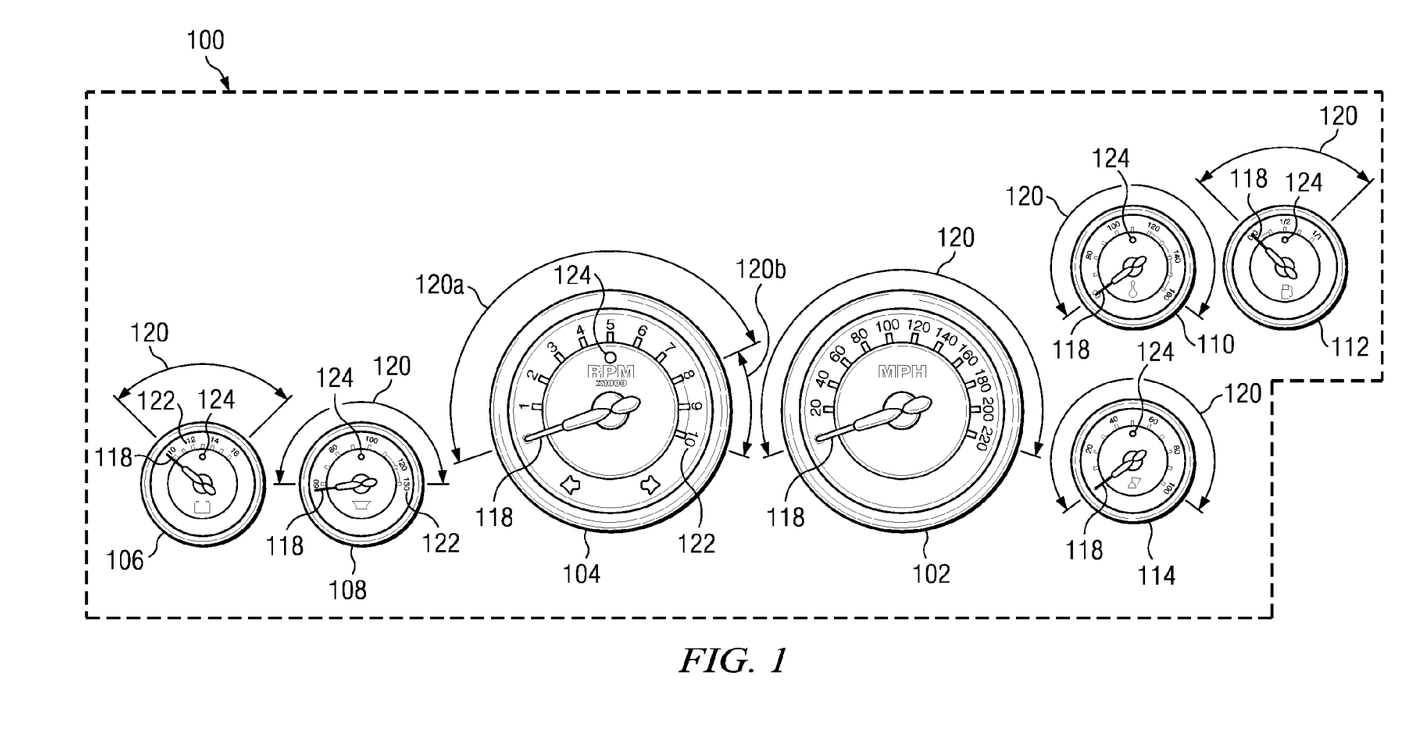
FIG. 1 illustrates a gauge cluster of analog-style instrumentation display devices in accordance with the disclosure.

Referring now to FIG. 1, there is illustrated a cluster of analog-style instrumentation display devices (often referred to as "gauges") in accordance with one embodiment of the disclosure. Instrument cluster 100 is similar in many respects to the conventional instrumentation found on the dashboards of cars, trucks and buses; however, as further described below, the gauges comprising cluster 100 have features, including an illuminated color-changing pointer, not found in the prior art. The disclosures described herein are also applicable to instrumentation displays for other vehicles such as boat and aircraft.

The cluster 100 includes a plurality of individual gauges, including a speedometer 102, tachometer 104, voltmeter 106, water temperature gauge 108, oil temperature gauge 110, fuel level gauge 112 and oil pressure gauge 114. Regardless of the technology (i.e., digital, analog, or mixed) used in the associated sensing units and drive mechanisms, each of the display devices 102-114 is considered an analog-style gauge because the values of the sensed or measured parameters (i.e., speed, RPMs, voltage, etc.) are represented by the position of pointers 118 moving within pre-defined ranges of motion 120. In some variations, the range of motion 120 may be sub-divided. For example, the tachometer 104 has a first sub-range of motion 120a corresponding to "normal" operation, and a second sub-range of motion 120b corresponding to "redline" operation. In addition, most of the gauges 102-114 include indicia 122 such as "tic marks" or numerical values disposed along the range of motion 120. Each of the gauges 104-114 includes an "alert" light 124 on its face, the function of which will be further described below.

Figure 2:
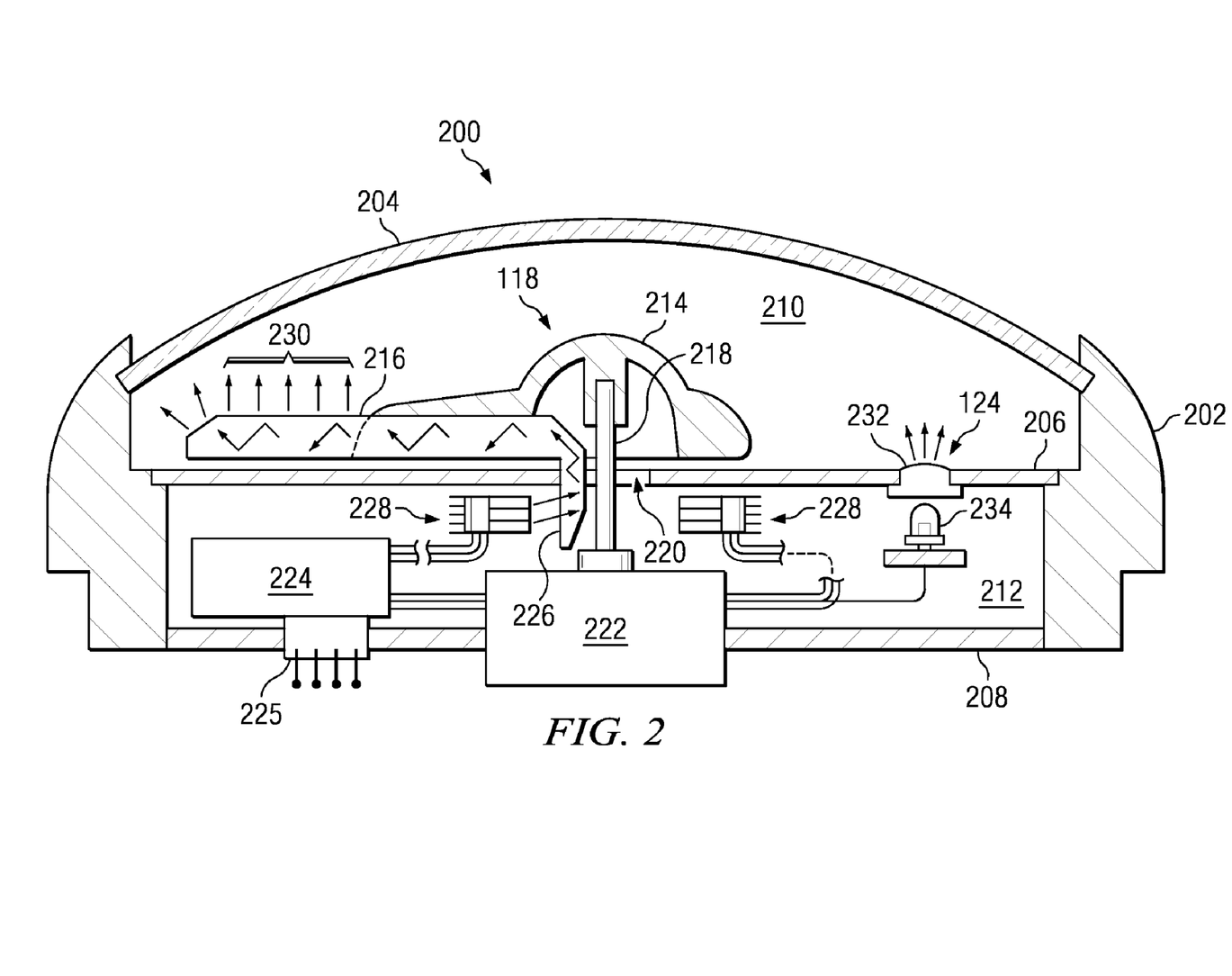
FIG. 2 is a cross-sectional view of a gauge in accordance with another embodiment.

Referring now to FIG. 2, there is shown a cross section of an instrumentation display device or gauge 200 in accordance with another embodiment. The structure of gauge 200 is representative of the gauges 102-114 of FIG. 1. The gauge 200 includes a housing 202 that supports a transparent lens or crystal 204, a central faceplate 206 and a backplate 208. The space between the lens 204 and faceplate 206 constitutes the front chamber 210 of the gauge, and the space between the faceplate 206 and the backplate 208 constitutes the rear chamber 212. The pointer 118 is disposed in the front chamber 210 and includes a hub 214 and a blade 216. The hub 214 is mounted on a shaft 218 extending through a passage 220 in faceplate 206 from an actuator 222 disposed in the back chamber 212. The actuator 222 is operably connected to control circuitry 224, which receives signals indicative of sensed parameters via external connector 226. Such signals indicative of sensed parameters may be in the form of electrical currents or voltages produced by remote analog sending units (not shown), digital signals produced by digital sending units or an on-board computer (see FIG. 3), or other types of signals. After receiving the indicative signals, the control circuitry 224 causes the actuator 222 to rotate the shaft 218, thereby rotating the pointer 118 within the range of motion 120 to indicate the value of the sensed parameter. The actuator 222 may be a digital stepper motor, analog magnetic movement, or other actuator of known type.

Illumination of the moving pointer 118 may be accomplished by any known means. In one variation, the pointer blade 216 is formed of transparent or translucent plastic. The innermost end of blade 216 may define a light guide structure 226 which extends through the faceplate passage 220 into the rear chamber 212. One or more light sources 228 capable of producing different colors of light are disposed in the rear chamber adjacent the light guide structure 226. Light (denoted by small arrows 230 in FIG. 2) emitted from the light sources 228 strikes the light guide structure 226 and is conducted through the transparent/translucent blade 216 to the outermost end of the pointer 118. Light escaping from the sides of the transparent/translucent blade 216 causes the pointer 118 to be illuminated in the color produced by the light sources 228.

In one embodiment, the light sources 228 are LEDs capable of emitting at of at least two colors of light. The LEDs may be packaged individually or may be packaged in groups, such as in a tri-color red-green-blue (RGB) LED package capable of producing a variety of colors. In other embodiments, the light sources 228 may be conventional light bulbs or other light sources, with multiple colors being produced by colored bulbs, lenses or filters. The LEDs or other light sources 228 are operably connected to the control circuitry 224, which can control the operation and/or color of the light sources in accordance with either built-in circuitry or with signals receive from other parts of the vehicle, e.g., the onboard computer.

In a preferred embodiment, the illumination color of the pointer 118 changes as the pointer moves through pre-selected portions (i.e., sub-ranges) of the range of motion 120 (see FIGS. 4a-4e). In one variation, the light guide structure 226 is directional, and a plurality of light sources 228 of appropriate colors are arranged at different radial angles surrounding the shaft 218. As the pointer 118 rotates around shaft 218, the light guide structure 226 will receive light from different colored light sources 228 such that it is illuminated in the desired color at each point of its rotation. In another variation, the light guide structure 226 is omni-directional, and a plurality of light sources 228 of appropriate colors are arranged adjacent the shaft 218. As the pointer 118 rotates around shaft 218, the control circuitry 224 will switch the various light sources 228 on and off such that light of the desired color is directed at the light guide structure 226 when the pointer 118 is in a particular portion of the range of motion.

Referring still to FIG. 2, the alert light 124 may include a lens 232 mounted in the faceplate 206 over a light source 234 disposed in the rear chamber 212. The alert light may be an LED, light bulb, or other light source, and it may emit a single color, or be capable of emitting multiple colors (e.g., an RGB package LED unit). The light source 234 is operably connected to the control circuitry 224, which can control the operation (on, off, flashing, etc.) and color (if applicable) of the alert light. By illuminating or flashing the alert light, the user's attention may be readily attracted to a particular gauge. In one variation, the alert light 124 flashes when particular conditions are met, e.g., sensed parameter is approaching unsafe level. In another variation, the alert light flashes at random intervals to encourage the user to check all gauges periodically.

Figure 3:
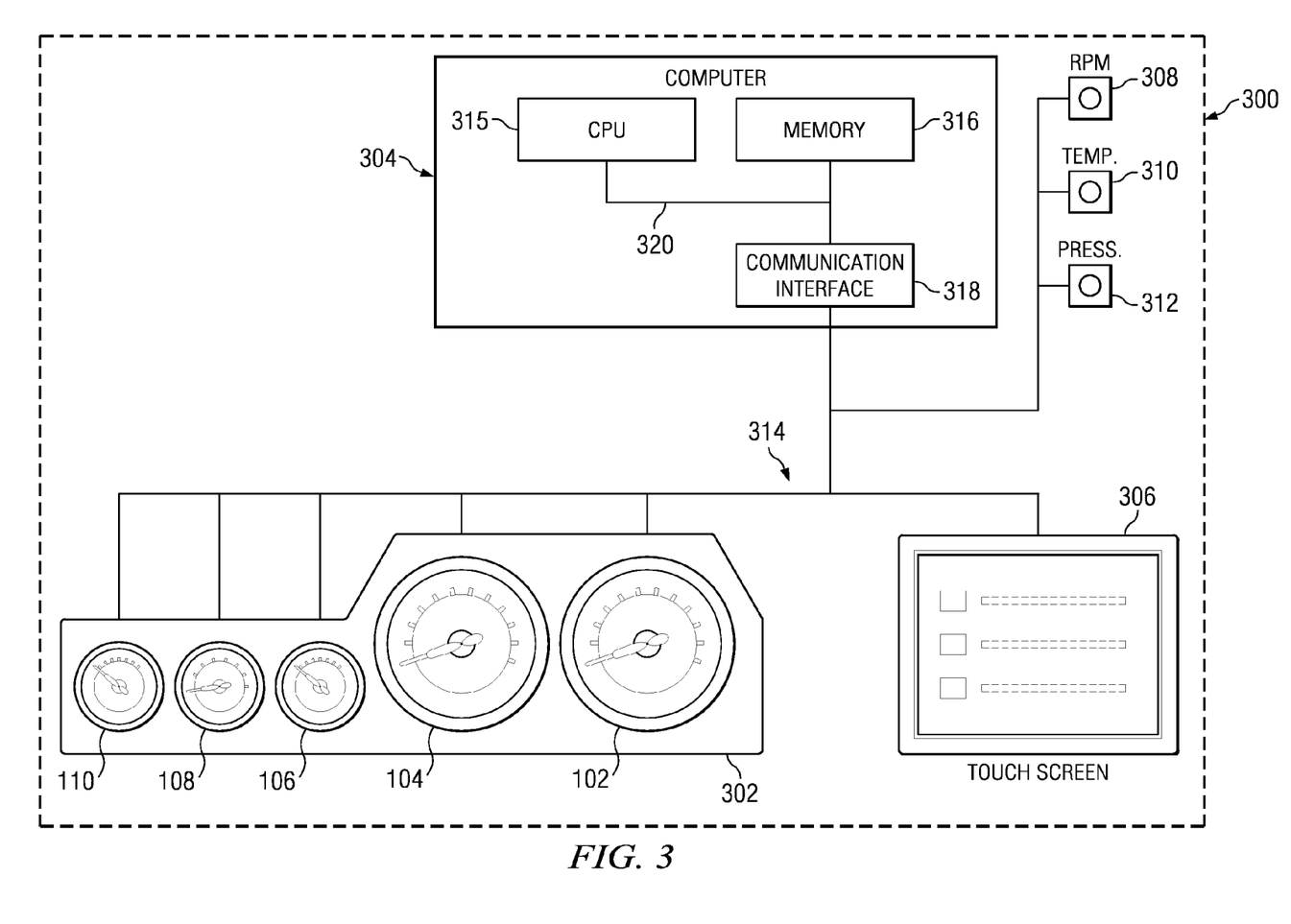
FIG. 3 illustrates a vehicle instrumentation system including a gauge/display cluster.

Referring now to FIG. 3, there is illustrated a vehicle instrumentation system 300 including a gauge/display cluster 302, an onboard computer 304 and touch-screen 306. The computer 304 receives signals from various discrete sensors 308, 310 and 312, processes the signals as necessary, then sends control signals via circuitry 314 (e.g., wiring harness or bus) to the gauge cluster 302 for control of the individual gauges 102-110 as previously described. Operation of the gauges 102-110 may be customized by user commands entered on the touch screen 306 (or other suitable I/O device). It is understood that the computer 304 is representative of any control device that may send control signals to the indicator devices/gauges 102-110. Accordingly, while the computer 304 is illustrated with a central processing unit (CPU) 314, memory 316, and communication interface 318 (which may be wired or wireless) coupled by one or more control lines 320 (e.g., internal bus), it is understood that many different control systems may be used with the gauge cluster 302 and that various components may be distributed. Furthermore, one or more control lines 314 coupling the computer 304 to the gauges 102-110 may be wired as shown or may be wireless.

Figure 4A:
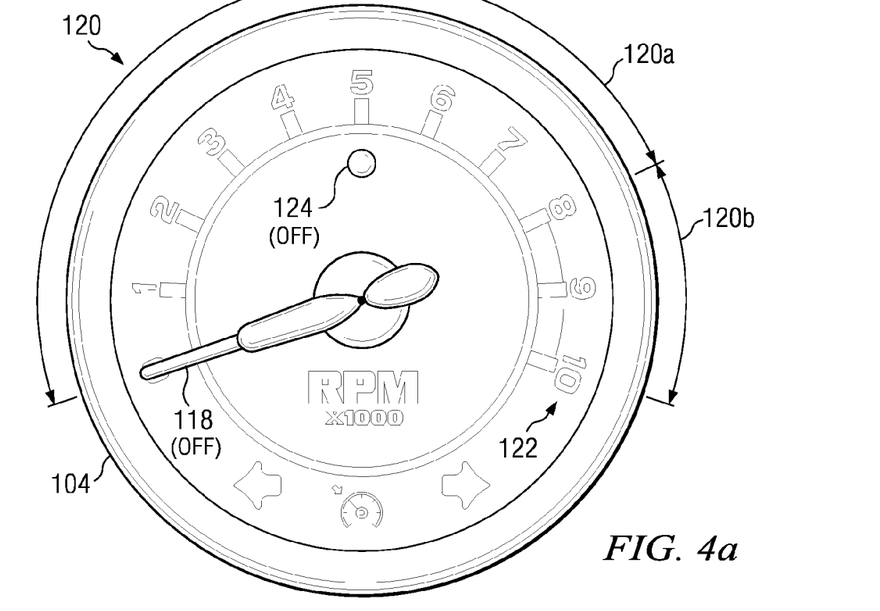
FIGS. 4a-4e illustrate a mode of operation of a instrumentation display device/gauge in accordance with another embodiment.
Figure 4B:
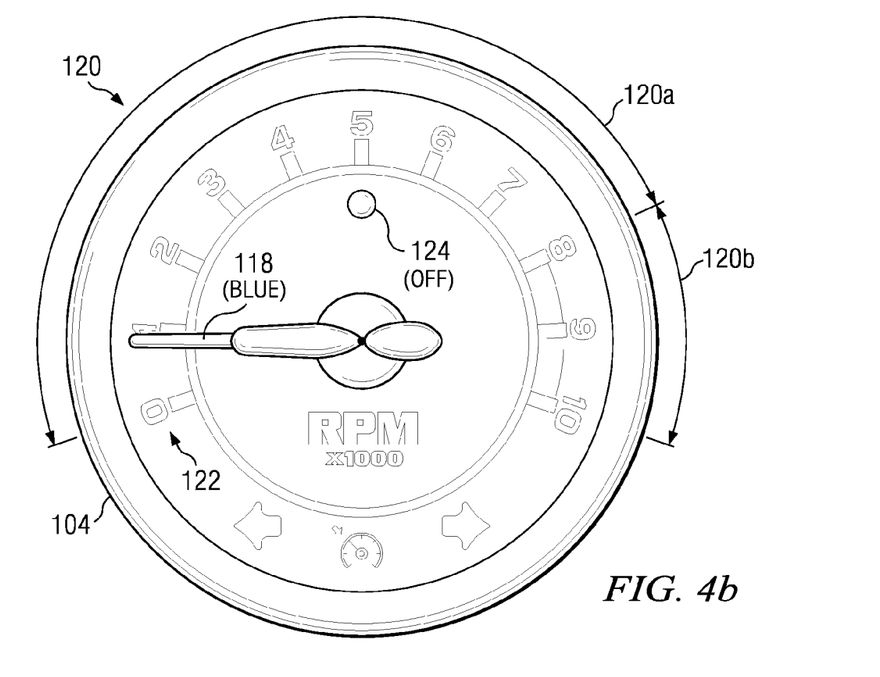
Figure 4C:
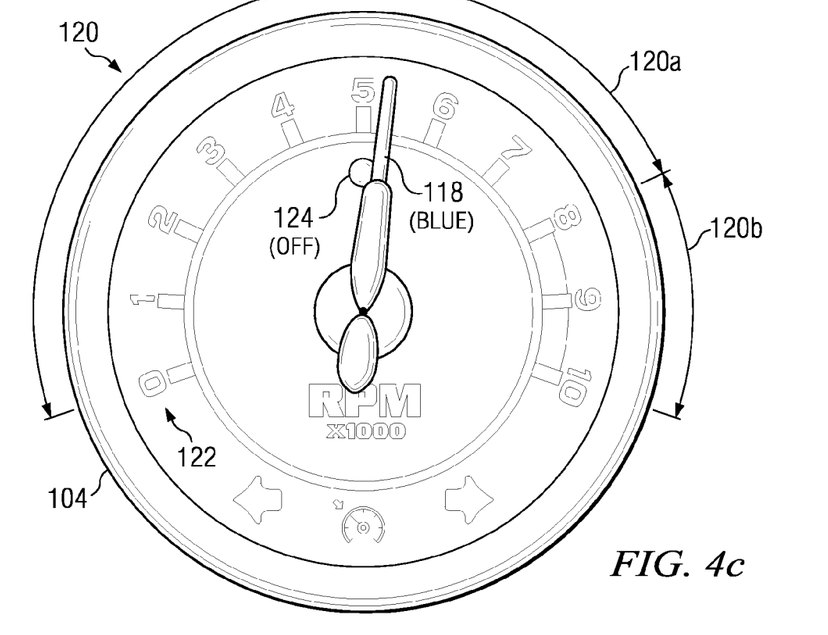
Figure 4D:
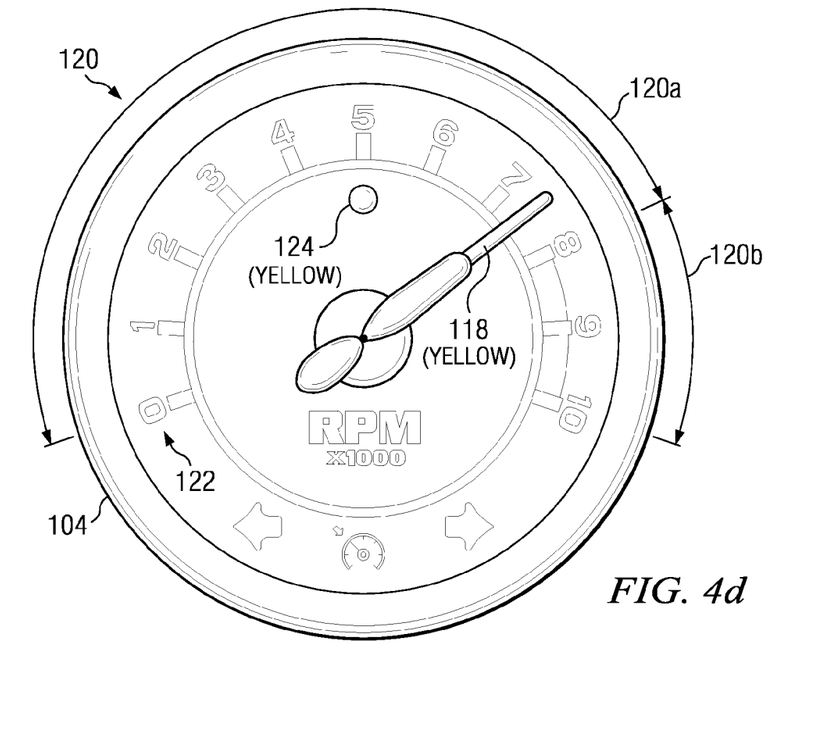
Figure 4E:
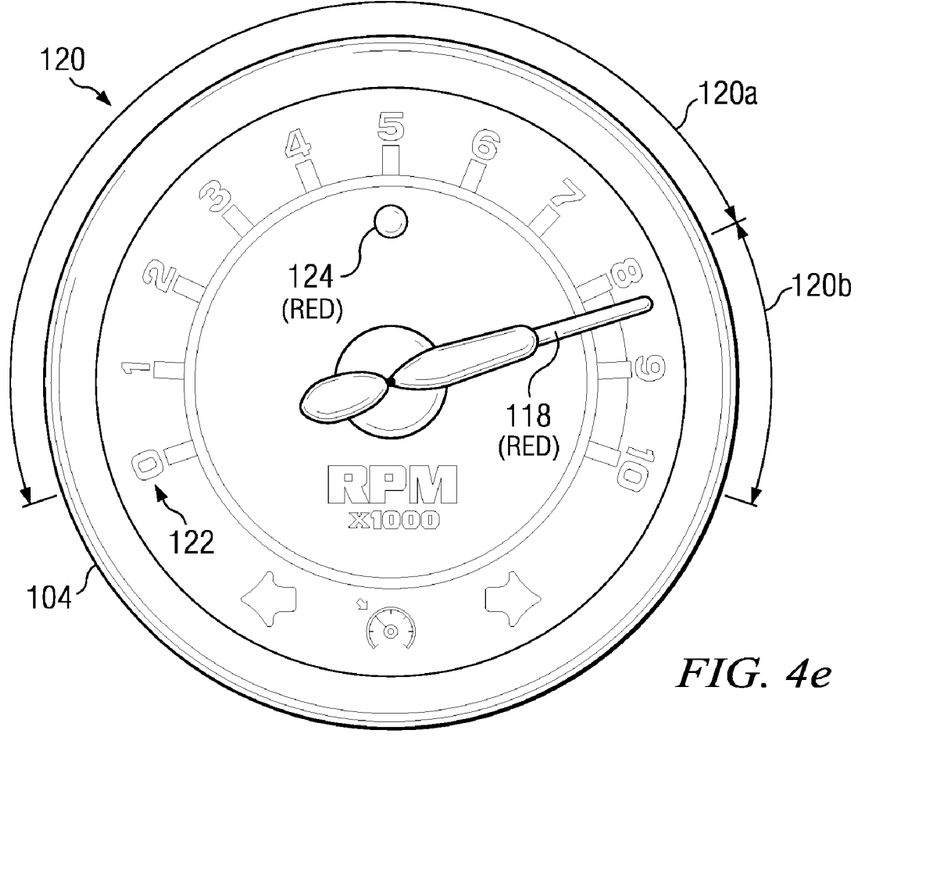

Referring now to FIGS. 4a-4e, there is illustrated the mode of operation of an instrumentation display device/gauge in accordance with another embodiment. For purposes of illustration, a tachometer 104 is pictured; however, gauges of other types can be operated in a substantially similar manner in accordance with the disclosure. Referring first to FIG. 4a, the gauge 104 is shown in a deactivated state (e.g., engine off). The pointer 118 is not illuminated in any color, and is positioned at the lowest point of range of motion 120. The alert light 124 is not illuminated. Referring next to FIG. 4b, the gauge 104 is shown with RPMs in the lower portion (i.e., first sub-range) of normal operation range 120a (e.g., idle). The pointer 118 is now illuminated in a first color, e.g., blue, and is positioned to indicate the current RPMs (approx. 1000) with indicia 122. The alert light 124 is not illuminated because there is no need to attract the operator's attention. Referring next to FIG. 4c, the gauge 104 is shown with RPMs in the middle portion (i.e., second sub-range) of normal operation range 120a (e.g., cruising). The pointer 118 remains illuminated in the first color, and is positioned to indicate the current RPMs (approx. 5000). The alert light 124 is not illuminated because there is no need to attract the operator's attention. Referring next to FIG. 4d, the gauge 104 is shown with RPMs in the upper portion (i.e., third sub-range) of normal operation range 120a (e.g., passing), approaching the safe operation limit. The pointer 118 is now illuminated in a second color, e.g., yellow, and is positioned to indicate the current RPMs (approx. 7200). The alert light 124 is now also illuminated in the second color to further attract the operator's attention to the fact that the RPMs are approaching the redline at 8000 RPM. Referring finally to FIG. 4e, the gauge 104 is shown with RPMs exceeding the normal operation limits (e.g., racing). The pointer 118 is now in the abnormal operating range 120b (i.e., fourth sub-range), is illuminated in a third color, e.g., red, and is positioned to indicate the current RPMs (approx. 8200). The alert light 124 is now illuminated in the third color to attract the operator's attention to the fact that the RPMs have exceeded the redline and damage to the engine is possible. In some variations, the alert light 124 is programmed to flash at this point. It will be appreciated that in preferred embodiments, all of the set points, colors and other operations (e.g., flashing) of the pointer 118 and the alert light 124 on each gauge are controlled by the onboard computer 304, and thus may be customized as desired using the touch screen 306.

Figure 5:
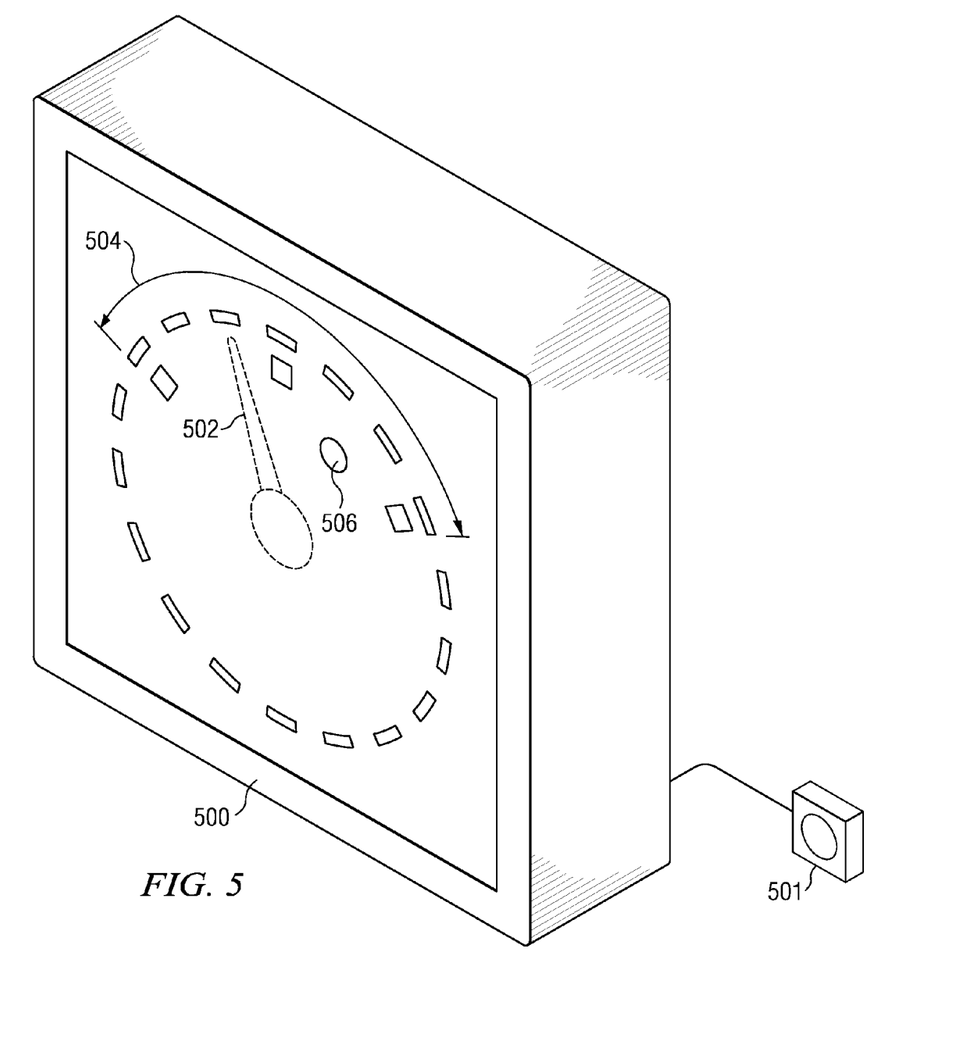
FIG. 5 illustrates a digital flat-panel display screen that is configured to function as analog-style instrumentation display device.

Referring now to FIG. 5, there is illustrated a digital flat-panel display screen 500 that is configured to function as analog-style instrumentation display device for remote sensor 501. Since the flat-panel 500 uses the image (i.e., displayed in pixels) of a pointer 502 moving within a range of motion 504 to indicate a sensed parameter from sensor 501, it is considered an analog-style gauge even though it uses entirely digital technology. With suitable programming, the virtual pointer 502 can be illuminated with different colors at different parts of the range of motion 504 in accordance with the previous disclosure. A virtual alert light 506 can also be provided and programmed to act in the same manner as a physical alert light 124.

It will be appreciated by those skilled in the art having the benefit of this disclosure that this analog-style instrumentation display with color-changing pointer provides an analog-style instrumentation display device with color-changing pointer for use on gauges, gauge dials and other indicators. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifica-

What is claimed is:

1. An analog-style gauge for receiving signals from a remote sensor and displaying a value of a parameter sensed by the remote sensor, the gauge comprising:
   an actuator having a shaft that is selectively rotatable through a range of motion having a plurality of sub-ranges;
   a pointer fixedly attached to the actuator shaft and adapted to be internally illuminated;
   a light source selectively producing a plurality of illumination colors and disposed so as to internally illuminate the pointer in a selected illumination color;
   control circuitry operably connected to the actuator and the light source;
      the control circuitry rotating the actuator shaft within the range of motion in response to signals received from the remote sensor until the pointer is in a position indicative of the value of the sensed parameter such that the pointer is visible at the position; and
      the control circuitry controlling the selected illumination color of the light source to be indicative of the sub-range of motion within which the actuator shaft is positioned;
   whereby the illumination color of the pointer will change color when the pointer reaches a predetermined point within the range of motion.

2. A gauge in accordance with claim 1, further comprising:
   a housing defining an interior cavity;
   a faceplate mounted in the interior cavity of the housing to define a back chamber within which the actuator is disposed and a front chamber within which at least a portion of the pointer is disposed, the faceplate having indicia disposed on a front side thereof for indicating the value of the sensed parameter when the pointer is adjacent thereto.

3. A gauge in accordance with claim 2, further comprising:
   an alert light mounted in the faceplate so as to be visible from the front of the gauge and operably connected to the control circuitry;
   the alert light being selectively illuminated in response to signals received from the control circuitry.

4. A gauge in accordance with claim 3, wherein:
   the alert light comprises a plurality of light-producing elements having different illumination colors, each of which may be selectively illuminated in response to signals received from the control circuitry as the pointer moves through different sub-ranges of motion;
   whereby the illumination color of the alert light changes as the pointer moves through different sub-ranges of motion.

5. A gauge in accordance with claim 2, wherein:
   the light source is disposed in the rear chamber; and
   the pointer comprises a light guide for conducting the light produced by the light source from the rear chamber to the portion of the pointer disposed in the front chamber;
   whereby the pointer is illuminated in the color of the light source.

6. A gauge in accordance with claim 5, wherein:
   the light source comprises a plurality of discrete light-producing elements of different illumination colors arrayed around the shaft at different radial angles corresponding to different sub-ranges of motion; and
   the light guide is a directional-type light guide having a receiving direction that conducts the light emitted from the light-producing element disposed in the receiving direction;
   whereby the illumination color of the pointer changes as the pointer moves through different sub-ranges of motion.

7. A gauge in accordance with claim 6, further comprising:
   an alert light mounted in the faceplate so as to be visible from the front of the gauge and operably connected to the control circuitry; and
   the alert light being selectively illuminated in response to signals received from the control circuitry as the pointer moves through different sub-ranges of motion;
   whereby the illumination state of the alert light changes as the pointer moves through different sub-ranges of motion.

8. A gauge in accordance with claim 5, wherein:
   the light guide is an omnidirectional-type light guide that conducts the light emitted from any adjacent light-producing element; and
   the light source comprises a plurality of light-producing elements of different illumination colors disposed adjacent the shaft that are selectively turned on and off by the control circuitry as the pointer moves through different sub-ranges of motion;
   whereby the illumination color of the pointer changes as the pointer moves through different sub-ranges of motion.

9. A gauge in accordance with claim 8, further comprising:
   an alert light mounted in the faceplate so as to be visible from the front of the gauge and operably connected to the control circuitry; and
   the alert light being selectively illuminated in response to signals received from the control circuitry as the pointer moves through different sub-ranges of motion;
   whereby the illumination state of the alert light changes as the pointer moves through different sub-ranges of motion.

10. A gauge in accordance with claim 1, wherein the light source is carried on the pointer itself.

11. A gauge in accordance with claim 10, wherein the light source comprises a plurality of individually packaged light-producing elements of different illumination colors within the pointer.

12. A gauge in accordance with claim 10, wherein the light source comprises a plurality of light-producing elements of different illumination colors packaged in a single package within the pointer.

13. A vehicle instrumentation system for displaying, by means of a position of a pointer within a range of motion having a plurality of sub-ranges, a current value of a parameter sensed by a remote sensor and simultaneously indicating, by means of an illumination color of the pointer, the sub-range within which the value of the parameter currently lies, the system comprising:
   an onboard computer mounted in the vehicle and operatively connected to the remote sensor to receive signals therefrom indicative of the current parameter value at the remote sensor, the computer including
      a memory storing data regarding a plurality of sub-ranges, data for each sub-range including the parameter values included within the sub-range and
      an illumination color assigned to each sub-range; and
      a processor receiving the current parameter value, accessing the data in the memory to identify the sub-range within which the current parameter value lies and the illumination color assigned to the identified sub-range, and producing pointer control signals based on the current parameter value and illumination color control signals based on the illumination color assigned to the identified sub-range; and a gauge having a movable pointer that can be selectively positioned and selectively illuminated with a plurality of illumination colors, the pointer being positioned based on the pointer control signals received from the onboard computer such that the pointer is visible within the sensed sub-range of the parameter and being illuminated based on the illumination color control signals received from the onboard computer.

14. A vehicle instrumentation system in accordance with claim 13, further comprising a touch screen operatively connected to the onboard computer for entering data values into the memory of the onboard computer, the data values comprising information for each sub-range including the parameter values included within the sub-range and the illumination color assigned to each sub-range.

15. A vehicle instrumentation system in accordance with claim 14, wherein the gauge is an analog-type gauge further comprising:

a housing defining an interior cavity;

control circuitry disposed adjacent to the housing and operatively connected to the onboard computer;

an actuator mounted in the housing and operatively connected to the control circuitry, the actuator having a shaft upon which the pointer is mounted, the shaft being selectively rotatable through the range of motion having the plurality of sub-ranges in response to signals received from the control circuitry;

a light source mounted in the housing and operatively connected to the control circuitry, the light source selectively producing a plurality of illumination colors in response to signals received from the control circuitry, the light source being disposed so as to internally illuminate the pointer in the selected illumination color; and a faceplate mounted in the interior cavity of the housing to define a back chamber within which the actuator is disposed and a front chamber within which at least a portion of the pointer is disposed, the faceplate having indicia disposed on a front side thereof for indicating the value of the sensed parameter when the pointer is adjacent thereto.

16. A vehicle instrumentation system in accordance with claim 15, further comprising:

an alert light mounted in the faceplate so as to be visible from the front of the gauge and operatively connected to the control circuitry; and the alert light being selectively illuminated in response to signals received from the control circuitry as the pointer moves through different sub-ranges of motion;

whereby the illumination state of the alert light changes as the pointer moves through different sub-ranges of motion.

17. A method of operating a gauge for displaying a current value of a parameter sensed by a remote sensor and simultaneously indicating a sub-range within a plurality of sub-ranges within which the current value of the parameter lies, the method comprising:

moving a pointer within a range of motion to a position indicative of the current value of the sensed parameter such that the pointer is visible in the sub-range within which the current value of the sensed parameter lies;

determining which sub-range of a plurality of sub-ranges the current value of the sensed parameter lies within;

determining which illumination color of a plurality of illumination colors is associated with the determined sub-range; and illuminating the pointer with the illumination color associated with the determined sub-range.

18. A method in accordance with claim 17, further comprising:

determining which illumination state of a plurality of illumination states is associated with the determined sub-range; and illuminating an alert light with the illumination state associated with the determined sub-range.

19. A method in accordance with claim 18, wherein the plurality of illumination states for the alert light includes ON, OFF and BLINKING.

20. A method in accordance with claim 18, wherein the plurality of illumination states for the alert light includes a plurality of different illumination colors and wherein the alert light comprises a plurality of light-producing elements having different illumination colors, each of which may be selectively illuminated as the pointer moves through different sub-ranges of motion in response to signals received from the remote sensor;

whereby the illumination color of the alert light changes as the pointer moves through different sub-ranges of motion.

* * * * *